United States Patent
Intwala

(10) Patent No.: US 7,965,301 B1
(45) Date of Patent: Jun. 21, 2011

(54) COLOR CONVERSION PRESERVING GLOBAL AND LOCAL IMAGE CHARACTERISTICS

(75) Inventor: Chintan Intwala, Santa Clara, CA (US)

(73) Assignee: Adobe Systems Incorporated, San Jose, CA (US)

(*) Notice: Subject to any disclaimer, the term of this patent is extended or adjusted under 35 U.S.C. 154(b) by 767 days.

(21) Appl. No.: 12/040,456

(22) Filed: Feb. 29, 2008

(51) Int. Cl.
*G09G 5/00* (2006.01)
*G09G 5/02* (2006.01)
*H04N 5/46* (2006.01)
*H04N 1/46* (2006.01)
*H04N 1/60* (2006.01)
*G06K 9/40* (2006.01)
*G03F 3/08* (2006.01)
*H04N 5/202* (2006.01)
*H04N 1/06* (2006.01)
*G06K 9/00* (2006.01)
*G06K 9/54* (2006.01)

(52) U.S. Cl. ........ 345/604; 345/643; 345/591; 345/593; 345/606; 348/254; 348/488; 348/557; 358/518; 358/519; 358/1.9; 358/525; 382/167; 382/254; 382/274; 382/300

(58) Field of Classification Search .......... 345/427–428, 345/581, 586, 589–593, 600–604, 606, 643, 345/618–619, 549, 556; 348/253–254, 441, 348/488, 496, 498, 502, 557; 358/1.9, 2.1, 358/518–519, 523, 525; 382/162–167, 206, 382/254

See application file for complete search history.

(56) References Cited

U.S. PATENT DOCUMENTS

| 7,019,755 | B2 | 3/2006 | Krueger |
| 7,023,448 | B1 | 4/2006 | Danciu |
| 7,161,710 | B1 | 1/2007 | MacLeod |
| 7,227,666 | B1 | 6/2007 | MacLeod |
| 7,327,875 | B2 | 2/2008 | Sawada |
| 7,468,813 | B1 * | 12/2008 | MacLeod ........................ 358/1.9 |
| 7,639,262 | B2 * | 12/2009 | Danciu .......................... 345/589 |
| 2003/0098986 | A1 * | 5/2003 | Pop ................................ 358/1.9 |
| 2005/0219561 | A1 * | 10/2005 | Haikin ............................ 358/1.9 |
| 2006/0001931 | A1 * | 1/2006 | Danciu ........................... 358/527 |
| 2006/0290961 | A1 * | 12/2006 | Low et al. ..................... 358/1.13 |
| 2007/0008559 | A1 * | 1/2007 | Rich et al. ....................... 358/1.9 |
| 2007/0076260 | A1 * | 4/2007 | Upton ........................... 358/3.21 |

OTHER PUBLICATIONS

Qing Luan and Fang Wen and Daniel Cohen-Or and Lin Liang and Ying-Qing Xu and Heung-Yeung Shum, "Natural Image Colorization," Rendering Techniques 2007 (Eurographics Symposium on Rendering), Jun. 2007, Eurographics, Grenoble, France.

(Continued)

*Primary Examiner* — Wesner Sajous
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for color conversion of a digital image. The digital image comprises a source set of pixels. A perceptual distance may be determined between the source set of pixels and a respective destination set of pixels for each of a plurality of rendering intents. A rendering intent corresponding to the smallest perceptual distance may be selected automatically. The source set of pixels may be converted to an output set of pixels using the selected rendering intent.

24 Claims, 6 Drawing Sheets

OTHER PUBLICATIONS

Xuemei Zhang and Brian A. Wandell, "A Spatial Extension of CIELAB for Digital Color Image Reproduction," Proceedings of the Society for Information Display 96 Digest, 1996, pp. 731-734, San Diego.

Bruce Fraser, "Out of Gamut: Realizing Good Intentions with Rendering Intents," http://www.creativepro.com/printerfriendly/story/12641.html , Apr. 4, 2001.

* cited by examiner

COLOR CONVERSION PRESERVING GLOBAL AND LOCAL IMAGE CHARACTERISTICS

BACKGROUND

1. Field of the Invention

The present invention is directed to computer systems; and more particularly, it is directed to a color conversion process for digital images using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green, blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of digital images. The geometric objects may typically be located in two-dimensional or three-dimensional space. Suitable image editors, such as Adobe Illustrator® (available from Adobe Systems Incorporated), may be used to perform operations on these objects. Typical operations include rotation, translation, stretching, skewing, changing depth order, and combining objects with other objects. While raster graphics may often lose apparent quality when scaled to a higher resolution, vector graphics may scale to the resolution of the device on which they are ultimately rendered. To render vector graphics on raster-based imaging devices (e.g., most display devices and printers), the geometric objects are typically converted to raster graphics data in a process called rasterization. Prior to final rasterization, surfaces defined by the geometric objects may be covered with non-overlapping polygons (e.g., triangles or quadrilaterals) in a process called tessellation.

Various devices used in capturing and rendering digital images may use different color models and corresponding color spaces. For example, digital display devices typically use the RGB color model, and color printers often use the CMYK color model. Both the RGB and CMYK (cyan, magenta, yellow, and key [black]) models are dependent color spaces, and both may require an absolute or independent color space (e.g., a large Lab color space approximating human vision) to provide meaning to the underlying color data. Thus, an International Color Consortium (ICC) profile may be provided along with the actual color data in the digital image. For a digital photograph, for example, the ICC color profile may be provided by the capture device (e.g., a particular model of digital SLR camera). The color profile associated with a device may attempt to represent all the possible colors for a particular device. Devices used for the capture, editing, and reproduction of digital images may have corresponding color profiles.

For accurate reproduction, it is desirable that the color profiles of the capturing device and the reproduction device match as closely as possible. However, certain color spaces have a larger gamut than others. For example, a typical high-end color space used for image capture and editing, such as ProPhoto or AdobeRGB, is much larger than that of a typical printer. Accurate printing of a digital photograph may involve converting the photograph from the source color space (e.g., AdobeRGB) to the printer's destination color space. Improper color conversion may result in inaccurate or unsatisfactory reproduction of a digital image.

A particular technique for color conversion may be referred to as a rendering intent. A particular rendering intent may be designed to maintain particular characteristics of the color data in the image. Standard rendering intents include "Relative Colorimetric," "Absolute Colorimetric," "Saturation," and "Perceptual." However, each rendering intent may have a limitation. Thus, some image characteristics (e.g., color saturation, contrast, texture, or vibrancy) may be lost while other characteristics are preserved during a color conversion process using a particular rendering intent. When determining which rendering intent to use, photographers and editors typically judge the differences perceptually.

SUMMARY

Various embodiments of systems, methods, and computer-readable storage media for color conversion preserving image characteristics are disclosed. A digital image may comprise a source set of pixels. A perceptual distance may be determined between the source set of pixels and a respective destination set of pixels for each of a plurality of rendering intents. A rendering intent corresponding to the smallest perceptual distance may be selected automatically. The source set of pixels may be converted to an output set of pixels using the selected rendering intent.

The source set of pixels may be expressed in a perceptually linear color space such as the S-CIELAB color space such that a Euclidean distance between two colors in S-CIELAB may properly indicate the perceptual difference between the two colors. In one embodiment, determining the perceptual distance comprises determining a summation of Euclidean distances between each color in the source set of pixels and each color in the respective destination set of pixels for each of the plurality of rendering intents. Automatically selecting the rendering intent may comprise selecting the rendering intent corresponding to the smallest summation of Euclidean distances.

In one embodiment, the digital image may be partitioned into a plurality of partitions. Different rendering intents may be automatically selected for different partitions of the digital image. For example, a first partition of the digital image may comprise the source set of pixels, and a second partition may comprise an additional source set of pixels. A perceptual distance between the additional set of pixels and a respective additional destination set of pixels may be determined for each of the plurality of rendering intents. An additional rendering intent may be automatically selected, wherein the additional rendering intent corresponds to the smallest perceptual distance between the additional set of pixels and the respective additional destination set of pixels for each of the plurality of rendering intents. The additional source set of pixels may be converted to an additional output set of pixels using the selected additional rendering intent.

Figure 1:
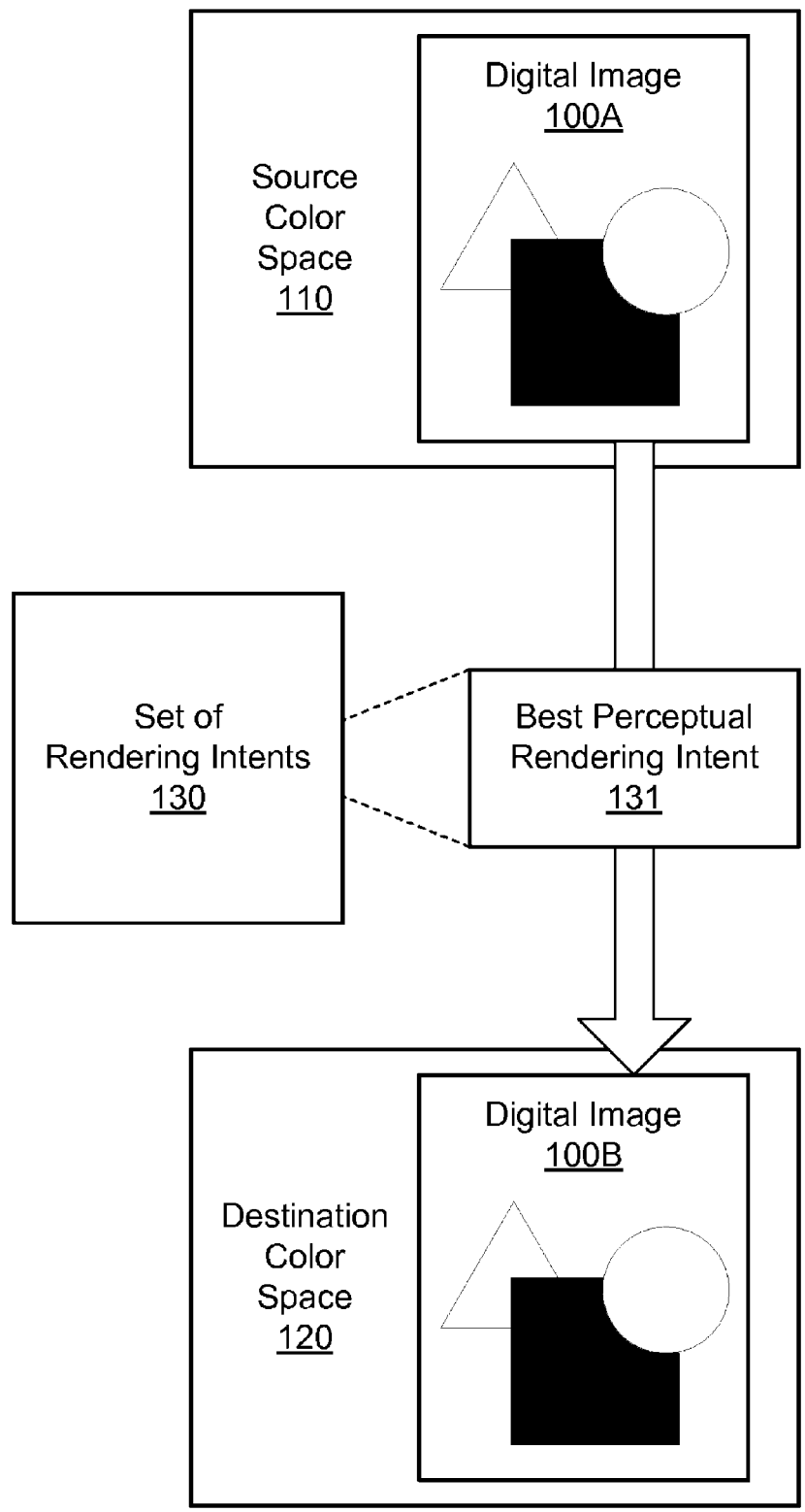
FIG. 1 is a block diagram illustrating a color conversion of a digital image using an automatically selected rendering intent according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Various embodiments may provide color conversion preserving global and local image characteristics. A rendering intent may comprise a mapping from a first color space to a second color space. Typically, the gamut of the source color space for a digital image (e.g., a digital image originating from a camera, scanner, or editing software) may be larger than the gamut of the color space of the destination device (e.g., a printer or display device). Thus, the application of a particular rendering intent to a digital image may involve a loss of information. Each rendering intent may have particular strengths and weaknesses in terms of preserving or losing characteristics (e.g., hue, contrast, smoothness, texture, etc.) of a digital image. Using the systems and methods described herein, the color conversion process may be optimized for preservation of global and local image characteristics. In various embodiments, the optimized color conversion process may include both automatic and user-influenced components.

In one embodiment, the color conversion may be performed using the S-CIELAB color space. S-CIELAB is a spatial extension to CIELAB. CIELAB is a Lab-based color model that approximates the colors visible to the human eye. The S-CIELAB and CIELAB spaces are perceptually linear. Therefore, a Euclidean distance between two colors in S-CIELAB or CIELAB may properly indicate the perceptual difference between the two colors. In comparison to CIELAB, S-CIELAB may be better suited for real-world images (i.e., images having complex texture). Additionally, S-CIELAB may be more accurate in predicting the perceptual differences between reproduced colors during a half-toning process associated with printing.

In one embodiment, a rendering intent may be automatically selected such that the selected rendering intent provides a best perceptual mapping from the source color space to the destination color space. The rendering intent may be selected from a set of potential rendering intents. In one embodiment, an energy value E may be determined for each of the potential rendering intents, where dist is a Euclidean distance function and C is the color of a pixel in S-CIELAB space in the destination image or the source image using the potential rendering intent:

$$E = \sum_x \sum_y dist(C_{destination}(x, y), C_{source}(x, y))$$

Thus, prior to determining the E value for each potential rendering intent, the rendering intent may be applied to the digital image to determine the destination color values for the image in the S-CIELAB color space. The original image (i.e., its pixels) may also be expressed in the S-CIELAB color space so that the source color values may be compared to the destination color values in the same color space. Again, because the S-CIELAB space is perceptually linear, the Euclidean distance between two colors in S-CIELAB may properly indicate the perceptual difference between the two colors. After E has been determined for each potential rendering intent, the rendering intent with the smallest E value may be selected for use in the color conversion process.

FIG. 1 is a block diagram illustrating a color conversion of a digital image using an automatically selected rendering intent according to one embodiment. A digital image 100A may be expressed in a source color space 110. Using the techniques discussed herein, a best perceptual rendering intent 131 for the image 100A may be automatically selected from a set of rendering intents 130. For example, the available rendering intents may include "Relative Colorimetric," "Absolute Colorimetric," "Saturation," and "Perceptual." As a result of a color conversion process using the selected rendering intent 131, the digital image 100B may be converted to a destination color space 120 (e.g., for printing or display in the destination color space 120).

Figure 2:
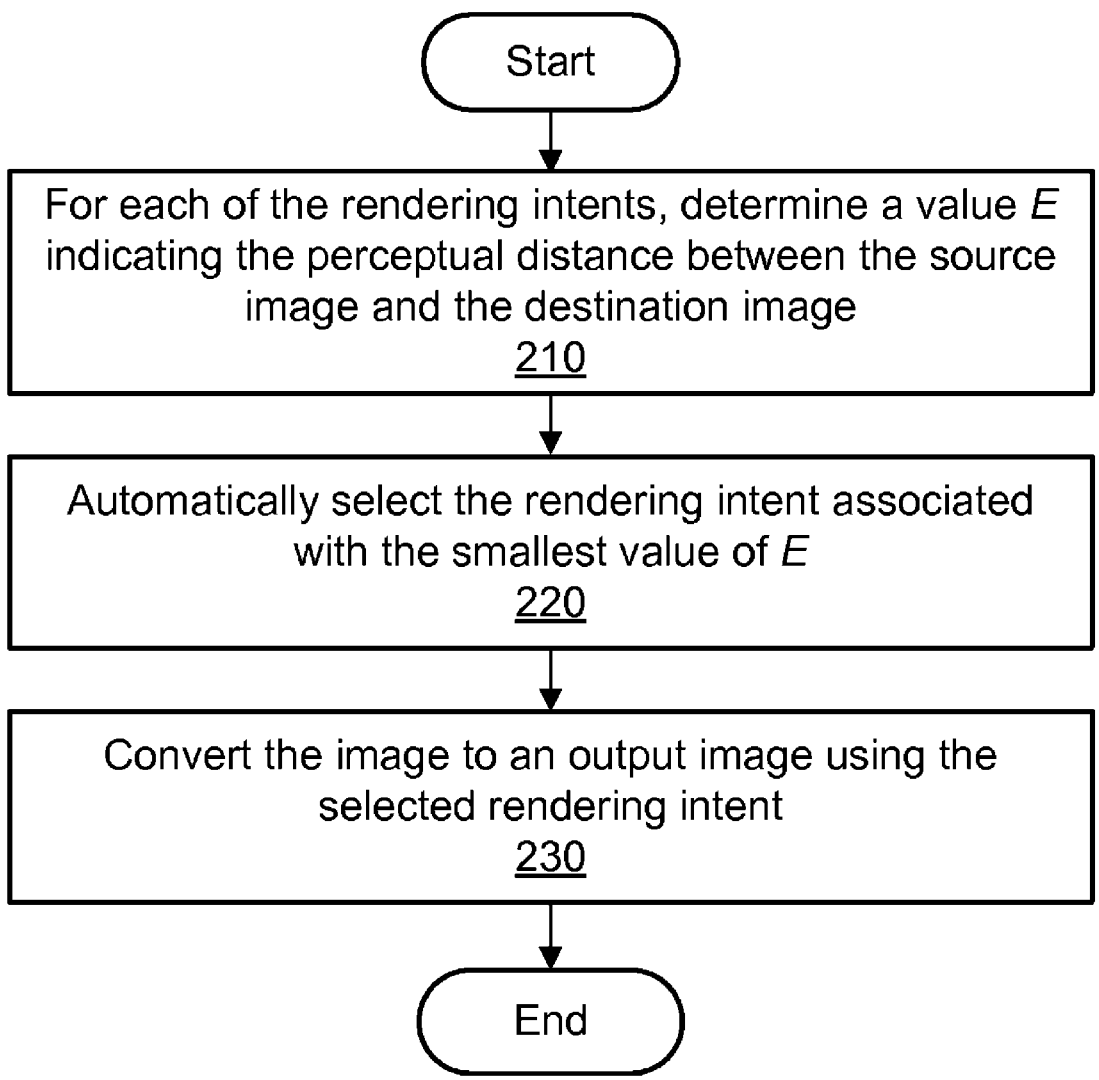
FIG. 2 is a flow diagram illustrating a method for color conversion including automatic selection of a rendering intent according to one embodiment.

FIG. 2 is a flow diagram illustrating a method for color conversion including automatic selection of a rendering intent according to one embodiment. A source image (i.e., the image sought to be converted) may be expressed in the S-CIELAB color space. Due to the large size of the S-CIELAB color space, a conversion of the source image from its original color space to S-CIELAB may typically not result in the loss of data or image characteristics. If the original color space is already the S-CIELAB color space, then a conversion to S-CIELAB is unnecessary. The source image may comprise a source set of pixels.

As shown in block 210, the value E may be determined for each of a plurality of rendering intents based on the formula discussed above. As discussed above, E may indicate the perceptual distance between the source image and the destination image for a particular rendering intent.

As shown in block 220, the rendering intent corresponding to the smallest value of E may be automatically selected for the color conversion of the image. In one embodiment, the selected rendering intent may provide the best perceptual mapping of the digital image from the source color space (e.g., of the capture device and/or editing platform) to the destination color space (e.g., of the printing or display device).

As shown in block 230, the image may be converted to an output image using the selected rendering intent. Using the selected rendering intent, the image may be converted from one color profile (e.g., an ICC profile of a capturing device or editing platform) to another profile (e.g., an ICC profile of a destination imaging device such as a printer or monitor).

Figure 3:
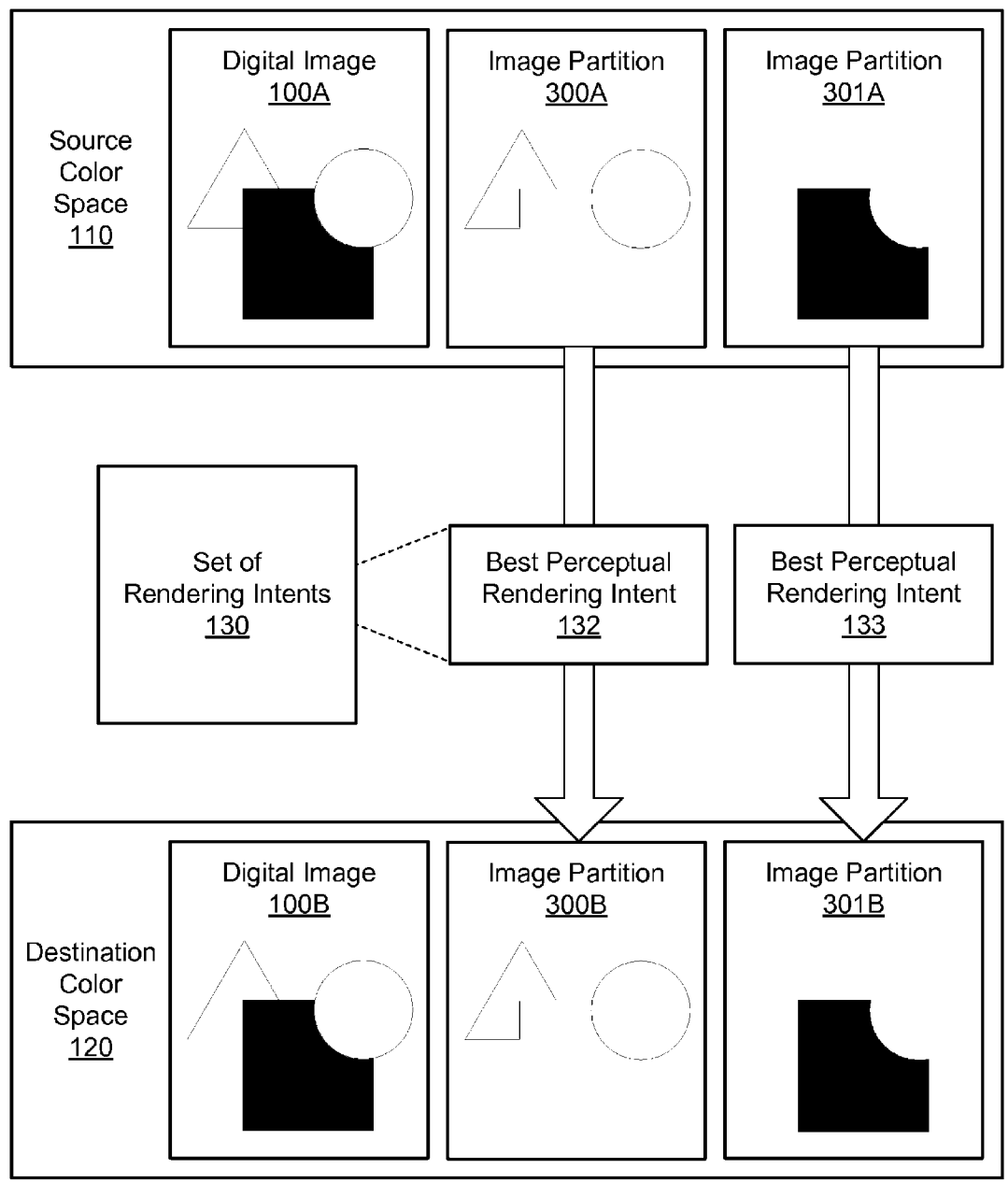
FIG. 3 is a block diagram illustrating a color conversion of a plurality of partitions of a digital image using automatically selected rendering intents according to one embodiment.

FIG. 3 is a block diagram illustrating a color conversion of a plurality of partitions of a digital image using automatically selected rendering intents according to one embodiment. In one embodiment, none of the potential rendering intents may provide a suitable mapping from the source color space to the destination color space. The determination of unsuitability may be made by a user. In this case, the user may partition the source image into two or more partitions, wherein each partition comprises a set of pixels. Each pixel in the image may belong to one and only one partition. In one embodiment, each partition may be associated with a label.

For example, a digital image may be divided into a first partition 300A and a second partition 301A. The first image partition 300A and the second image partition 301A may be expressed in a source color space 110. Using the techniques discussed herein, a best perceptual rendering intent 132 for the first image partition 300A may be automatically selected from a set of rendering intents 130. For example, the available rendering intents may include "Relative Colorimetric," "Absolute Colorimetric," "Saturation," and "Perceptual." Similarly, a best perceptual rendering intent 133 for the second image partition 301A may be automatically selected from the set of rendering intents 130. As a result of a color conversion process using the first selected rendering intent 132, the first image partition 300B may be converted to a destination color space 120 (e.g., for printing or display in the destination color space 120). Similarly, as a result of a color conversion process using the second selected rendering intent 133, the second image partition 301B may also be converted to the destination color space 120. The resulting digital image in the destination color space 120 may properly combine the first image partition 300B and the second image partition 301B in the same way that the two partitions are combined in the source color space 110.

The partitions (e.g., a first partition, a second partition, etc.) may be determined through various techniques. In one embodiment, suitable selection tools in a graphical user interface (GUI) of a digital image editing program may be used to determine the pixels in each partition. For example, a user may select various portions of the image with a "lasso" tool, "brush" tool, or "magic wand" tool. The user may also use a suitable tool to select all pixels within a particular range of colors. The various tools may be used to establish masks with varying degrees of sharpness. All the pixels in a particular partition may not be contiguous.

In one embodiment, a user may specify regions that are considered the most important to preserve. The regions may be turned into different partitions. In one embodiment, the regions may be turned into partitions by expanding them with neighbors with similar luminance and/or chromaticity. A similar distance metric used in the automatic selection of rendering intents may be used to expand the regions in this manner.

In one embodiment, an image may be partitioned using automatic techniques in addition to or in place of the user-influenced techniques discussed above. For example, algorithms that exploit textural similarity and intensity continuity may be used to determine different partitions.

Figure 4:
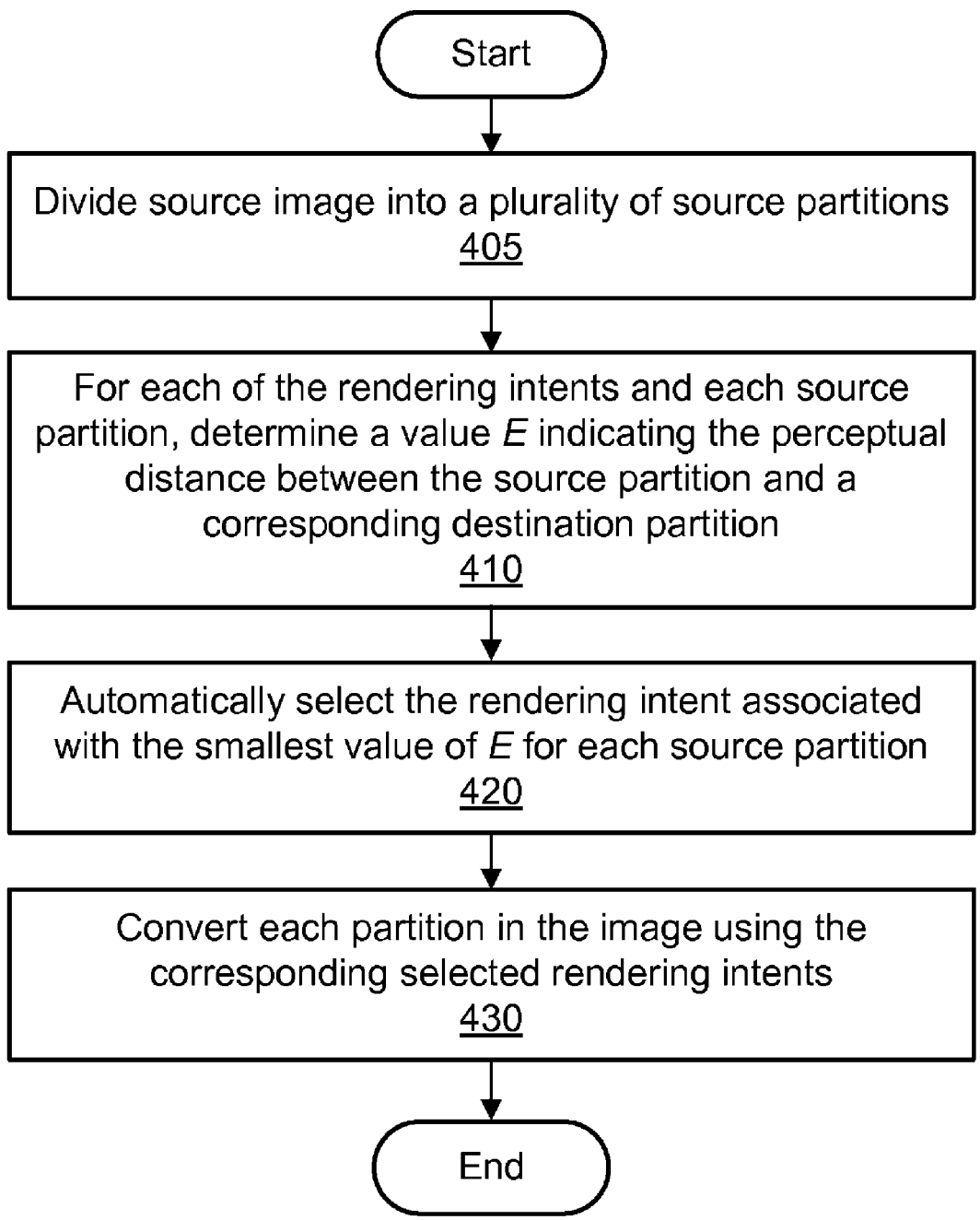
FIG. 4 is a flow diagram illustrating a method for color conversion including automatic selection of a rendering intent for a plurality of partitions of a digital image according to one embodiment.

FIG. 4 is a flow diagram illustrating a method for color conversion including automatic selection of a rendering intent for a plurality of partitions of a digital image according to one embodiment. A source image (i.e., the image sought to be converted) may be expressed in the S-CIELAB color space. Due to the large size of the S-CIELAB color space, a conversion of the source image from its original color space to S-CIELAB may typically not result in the loss of data or image characteristics. If the original color space is already the S-CIELAB color space, then a conversion to S-CIELAB is unnecessary.

As shown in block 405, the source image may be divided into a plurality of source partitions as discussed above. Each partition may comprise a set of pixels. For example, a first partition may comprise a source set of pixels, and a second partition may comprise an additional source set of pixels.

As shown in block 410, the value E may be determined for each rendering intent and each source partition based on the formula discussed above. As discussed above, E may indicate the perceptual distance between the source partition and the target partition for a particular rendering intent.

As shown in block 420, the rendering intent associated with the smallest value of E may be automatically selected for the color conversion of each partition of the image. In one embodiment, each selected rendering intent may provide the best perceptual mapping of a partition of the digital image from the source color space (e.g., of the capture device and/or editing platform) to the destination color space (e.g., of the printing or display device).

As shown in block 430, the image may be converted to an output image using the selected rendering intents. Using the selected rendering intents, the image may be converted from one color profile (e.g., an ICC profile of a capturing device or editing platform) to another profile (e.g., an ICC profile of a destination imaging device such as a printer or monitor).

Figure 5:
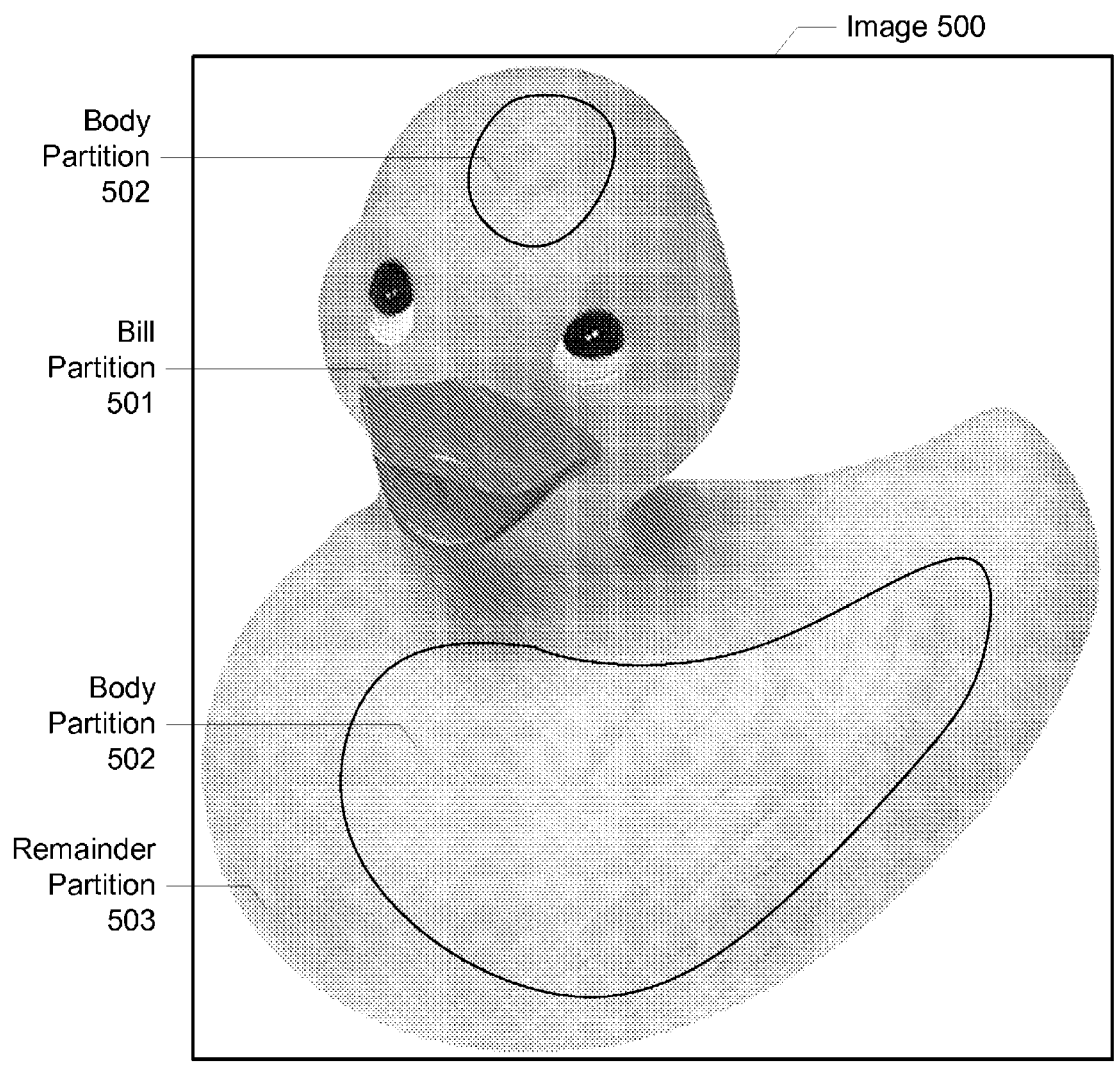
FIG. 5 is a block diagram illustrating an example of a digital image that is partitioned for automatic selection of rendering intents according to one embodiment.

FIG. 5 is a block diagram illustrating an example of a digital image 500 that is partitioned for automatic selection of rendering intents according to one embodiment. Using the systems and methods discussed with reference to FIGS. 1 and 2, the digital image 500 may lose global or local image characteristics when only one standard rendering intent is applied uniformly to the entire image 500. For example, using a "Relative Colorimetric" rendering intent, the "bill" area of the item depicted in the image 500 may be more washed-out in color than if an "Absolute Colorimetric" rendering intent is used. However, better texture detail may be achieved in some parts of the image 500 using the "Relative Colorimetric" rendering intent in comparison to the "Absolute Colorimetric" rendering intent.

Therefore, a user may divide the digital image 500 into a plurality of partitions using any suitable tools (e.g., in a GUI of a digital image editing program). In the example shown in FIG. 5, the pixels in the "bill" region of the item depicted in the image 500 may be placed into a first partition 501. Other pixels in the image 500 may be placed into a "body" partition 502. As depicted in the example, the body partition 502 includes two areas in different parts of the image 500. A "remainder" partition 503 may includes the rest of the image 500. As discussed with reference to FIGS. 3 and 4, a best perceptual rendering intent may be automatically selected for each partition. Thus, a plurality of rendering intents may be used in a color conversion process (e.g., to display or print the image), and global and local characteristics of the image may be better preserved. For example, the bill partition 501 and the body partition 502 may be converted to the target profile using the "Absolute Colorimetric" rendering intent, while the remainder partition 503 may be converted using the "Relative Colorimetric" rendering intent.

In one embodiment, global constraints may be applied while permitting local region-based control of the color conversion process. The global constraints may be used to preserve image characteristics either for the entire image or for particular partitions of the image. Although examples of the global constraints such as "smoothness" and "texture" are discussed as follows, additional types of global constraints are contemplated.

To apply a global smoothness constraint, image partitioning may be determined as discussed above with respect to FIGS. 3 through 5. The value of E may be minimized to find the appropriate rendering intent for a given partition of an image or for an entire image. Although the global constraint techniques discussed herein may be discussed with reference to an image, the techniques may be applied to a partition of an image as well. Applying the selected rendering intent to an image called $I_{original}$ may result in an image called $I_{converted}$. The quantity $D=I_{converted}-I_{original}$ may be computed.

In order to preserve the smoothness of $I_{original}$, regression techniques may be used to linearly fit a plane through the three-dimensional (3D) data set, $D(x,y)$. Next, each color value $I_{converted}(x,y)$ may be perturbed so that it falls on the plane. A term corr(x,y), called a correction term, may be defined such that $corr(x,y)=t^*(I_{original}(x,y)-I_{converted}(x,y))$. Varying the t for any real number may produce different colors. In one embodiment, the color values may be perturbed linearly as follows, where t is the independent variable to be found, and where the CLIP operation limits the colors going outside the destination space or crossing over to a different hue:

$$I_{final}(x,y)=CLIP[I_{converted}(x,y)+t^*(I_{original}(x,y)-I_{converted}(x,y))] \text{ or}$$

$$I_{final}(x,y)=CLIP[I_{converted}(x,y)+corr(x,y)]$$

In one embodiment, the correction term corr(x,y) may be added to $I_{converted}(x,y)$ to obtain the final result as shown above. In another embodiment, a weight-mask W(x,y) may be used to blend the result, thereby obtaining the final image including the global smoothness constraint as follows:

$$I_{final2}(x,y)=CLIP[I_{converted}(x,y)+corr(x,y)^*W(x,y)]$$

To apply a global texture constraint, image partitioning may be determined as discussed above with respect to FIGS. 3 through 5. The value of E may be minimized to find the appropriate rendering intent for a given partition of an image or for an entire image. Again, although the global constraint techniques discussed herein may be discussed with reference to an image, the techniques may be applied to a partition of an image as well. Applying the selected rendering intent to an image called $I_{original}$ may result in an image called $I_{converted}$.

The quantity $G_{converted}(x,y)=I_{converted\_x}(x,y)^2+I_{converted\_y}(x,y)^2$ may be computed, where $I_{converted\_x}$ and $I_{converted\_y}$ are image gradients in the x and y direction respectively. Similarly, $G_{original}(x,y)=I_{original\_x}(x,y)^2+I_{original\_y}(x,y)^2$ may be computed. The quantities $G_{converted}(x,y)$ and $G_{original}(x,y)$ carry the texture information. In one embodiment, $G_{converted}(x,y)$ and $G_{original}(x,y)$ may be matched in the regions of high texture content within the image. Therefore, an image W is determined as follows:

$$W=Normalize(Gaussian\_blur(Canny\_edge(I_{original})))$$

The image W gives higher importance to regions with high texture content and lower importance to smoother regions. As discussed with respect to the smoothness constraint, the colors may be perturbed linearly so that $G_{converted}$ and $G_{original}$ match, and $corr(x,y)=t^*(I_{original}(x,y)-I_{converted}(x,y))$ may be determined. The final image including the global texture constraint may be determined as follows, where the CLIP operation limits the colors going outside the destination space or crossing over to a different hue:

$$I_{final}(x,y)=CLIP[I_{converted}(x,y)+corr(x,y)^*W(x,y)]$$

In various embodiments, the techniques disclosed herein for color conversion may be implemented in various products such as image editors and/or readers, print drivers, display drivers, and other suitable elements in a rendering pipeline. The image editors and/or readers may include various products available from Adobe Systems, Inc., such as versions of Adobe Illustrator® or Adobe Acrobat®.

Figure 6:
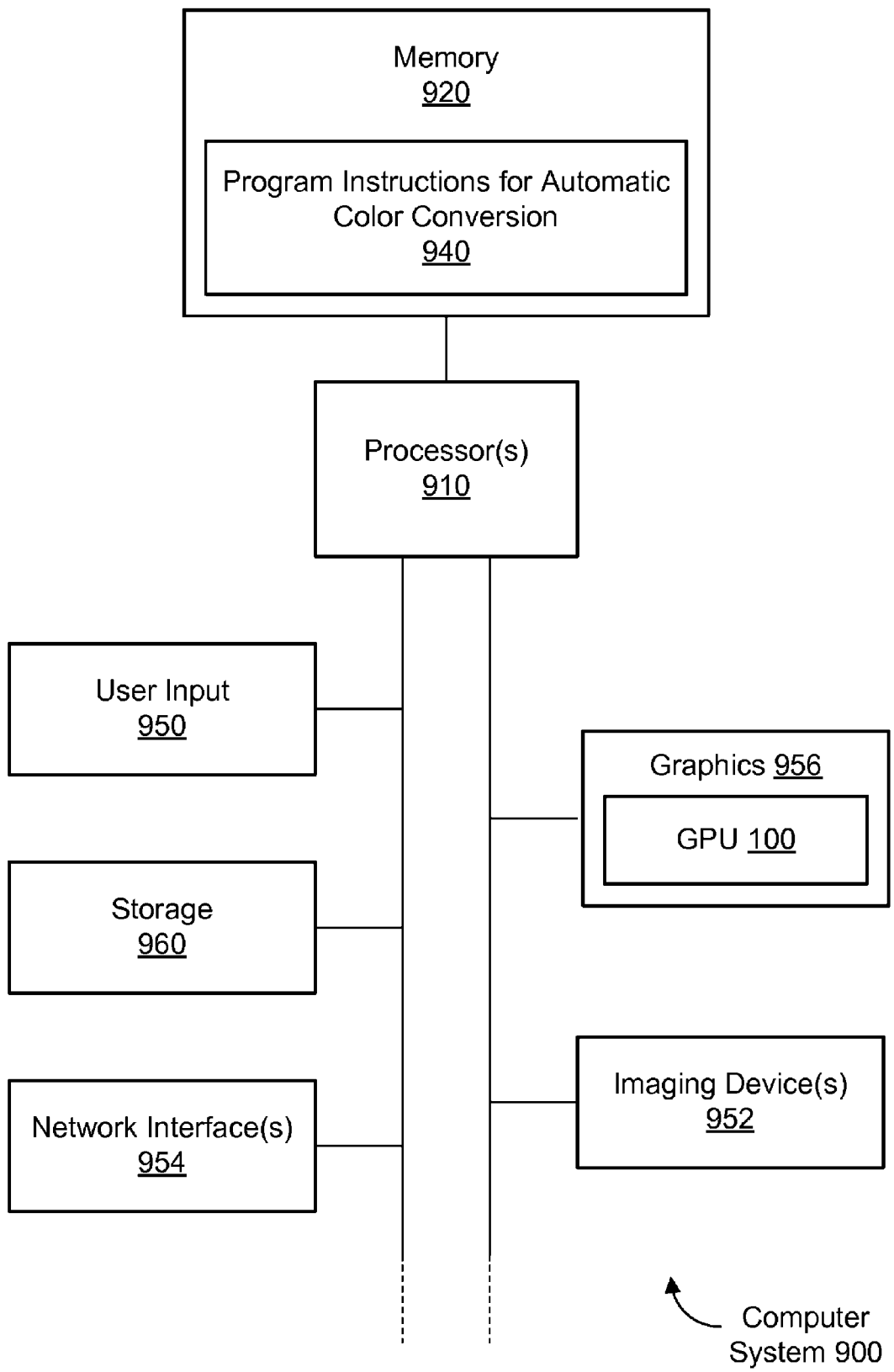
FIG. 6 is a diagram illustrating constituent elements of a computer system that is configured to implement embodiments of the system and method for color conversion.

FIG. 6 is a diagram illustrating constituent elements of a computer system 900 that is configured to implement embodiments of the system and method for color conversion. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Each of the one or more processors 910 may include one or more cores. Any desired operating system(s) may be run on the computer system 900, such as various versions of Unix, Linux, Windows® from Microsoft Corporation, Mac OS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 4. Additionally, the computer system 900 may include one or more imaging devices 952. The one or more imaging devices 952 may include various types of raster-based imaging devices such as monitors and printers. In one embodiment, the one or more imaging devices 952 may comprise one or more display devices 952 that are coupled to the graphics component 956 for display of data provided by the graphics component 956. The one or more imaging devices 952 may be used to print and/or display all or part of an image that is subject to a color conversion using the techniques described herein.

In one embodiment, program instructions 940 that may be executable by the processor(s) 910 to implement aspects of the color conversion techniques described herein may be partly or fully resident within the memory 920 at the computer system 900 at any point in time. The memory 920 may be implemented using any appropriate computer-readable memory medium such as any of various types of ROM or RAM (e.g., DRAM, SDRAM, RDRAM, SRAM, etc.), or combinations thereof. The program instructions may also be stored on a computer-readable storage device or computer-readable storage media 960 accessible from the processor(s) 910. Any of a variety of storage devices or storage media 960 may be used to store the program instructions 940 in different embodiments, including any desired type of persistent and/or volatile storage devices, such as individual disks, disk arrays, optical devices and associated media (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 5, as illustrated by the ellipsis shown.

In various embodiments, the elements shown in FIGS. 2 and 4 may be performed in a different order than the illustrated order. In FIGS. 2 and 4, any of the operations described in the elements may be performed programmatically (i.e., by a computer according to a computer program). In FIGS. 2 and 4, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method for color conversion of a digital image, wherein the digital image comprises a source set of pixels, the method comprising:
   determining a perceptual distance between the source set of pixels and a respective destination set of pixels for each of a plurality of rendering intents;
   automatically selecting a rendering intent corresponding to the smallest perceptual distance; and
   converting the source set of pixels to an output set of pixels using the selected rendering intent.

2. The method as recited in claim 1, wherein determining the perceptual distance between the source set of pixels and the respective destination set of pixels for each of the plurality of rendering intents comprises determining a summation of Euclidean distances between each color in the source set of pixels and each color in the respective destination set of pixels for each of the plurality of rendering intents.

3. The method as recited in claim 2, wherein automatically selecting the rendering intent corresponding to the smallest perceptual distance comprises selecting the rendering intent corresponding to the smallest summation of Euclidean distances.

4. The method as recited in claim 1, wherein the source set of pixels is expressed in a S-CIELAB color space.

5. The method as recited in claim 1, wherein converting the source set of pixels to the output set of pixels using the selected rendering intent comprises converting the source set of pixels to the output set of pixels using a color profile of an output device.

6. The method as recited in claim 1, wherein a first partition of the digital image comprises the source set of pixels, the method further comprising:
   determining a second partition of the digital image, wherein the second partition comprises an additional source set of pixels;
   determining a perceptual distance between the additional set of pixels and a respective additional destination set of pixels for each of the plurality of rendering intents;
   automatically selecting an additional rendering intent corresponding to the smallest perceptual distance between the additional set of pixels and the respective additional destination set of pixels for each of the plurality of rendering intents; and
   converting the additional source set of pixels to an additional output set of pixels using the selected additional rendering intent.

7. The method as recited in claim 1, further comprising:
   applying a global constraint to the output set of pixels to preserve a smoothness characteristic.

8. The method as recited in claim 1, further comprising:
   applying a global constraint to the output set of pixels to preserve a texture characteristic.

9. A computer-readable storage medium, storing program instructions for color conversion of a digital image, wherein the digital image comprises a source set of pixels, wherein the program instructions are computer-executable to implement:
   determining a perceptual distance between the source set of pixels and a respective destination set of pixels for each of a plurality of rendering intents;
   automatically selecting a rendering intent corresponding to the smallest perceptual distance; and
   converting the source set of pixels to an output set of pixels using the selected rendering intent.

10. The computer-readable storage medium as recited in claim 9, wherein determining the perceptual distance between the source set of pixels and the respective destination set of pixels for each of the plurality of rendering intents comprises determining a summation of Euclidean distances between each color in the source set of pixels and each color in the respective destination set of pixels for each of the plurality of rendering intents.

11. The computer-readable storage medium as recited in claim 10, wherein automatically selecting the rendering intent corresponding to the smallest perceptual distance comprises selecting the rendering intent corresponding to the smallest summation of Euclidean distances.

12. The computer-readable storage medium as recited in claim 9, wherein the source set of pixels is expressed in a S-CIELAB color space.

13. The computer-readable storage medium as recited in claim 9, wherein converting the source set of pixels to the output set of pixels using the selected rendering intent comprises converting the source set of pixels to the output set of pixels using a color profile of an output device.

14. The computer-readable storage medium as recited in claim 9, wherein a first partition of the digital image comprises the source set of pixels, wherein the program instructions are further computer-executable to implement:
   determining a second partition of the digital image, wherein the second partition comprises an additional source set of pixels;
   determining a perceptual distance between the additional set of pixels and a respective additional destination set of pixels for each of the plurality of rendering intents;
   automatically selecting an additional rendering intent corresponding to the smallest perceptual distance between the additional set of pixels and the respective additional destination set of pixels for each of the plurality of rendering intents; and
   converting the additional source set of pixels to an additional output set of pixels using the selected additional rendering intent.

15. The computer-readable storage medium as recited in claim 9, wherein the program instructions are further computer-executable to implement:
   applying a global constraint to the output set of pixels to preserve a smoothness characteristic.

16. The computer-readable storage medium as recited in claim 9, wherein the program instructions are further computer-executable to implement:

applying a global constraint to the output set of pixels to preserve a texture characteristic.

17. A system, comprising:

at least one processor; and a memory coupled to the at least one processor, wherein the memory stores a the digital image comprising a source set of pixels, wherein the memory stores program instructions, wherein the program instructions are executable by the at least one processor to:

determine a perceptual distance between the source set of pixels and a respective destination set of pixels for each of a plurality of rendering intents;

automatically select a rendering intent corresponding to the smallest perceptual distance; and convert the source set of pixels to an output set of pixels using the selected rendering intent.

18. The system as recited in claim 17, wherein determining the perceptual distance between the source set of pixels and the respective destination set of pixels for each of the plurality of rendering intents comprises determining a summation of Euclidean distances between each color in the source set of pixels and each color in the respective destination set of pixels for each of the plurality of rendering intents.

19. The system as recited in claim 18, wherein automatically selecting the rendering intent corresponding to the smallest perceptual distance comprises selecting the rendering intent corresponding to the smallest summation of Euclidean distances.

20. The system as recited in claim 17, wherein the source set of pixels is expressed in a S-CIELAB color space.

21. The system as recited in claim 17, wherein converting the source set of pixels to the output set of pixels using the selected rendering intent comprises converting the source set of pixels to the output set of pixels using a color profile of an output device.

22. The system as recited in claim 17, wherein a first partition of the digital image comprises the source set of pixels, and wherein the program instructions are executable by the at least one processor to:

determine a second partition of the digital image, wherein the second partition comprises an additional source set of pixels;

determine a perceptual distance between the additional set of pixels and a respective additional destination set of pixels for each of the plurality of rendering intents;

automatically select an additional rendering intent corresponding to the smallest perceptual distance between the additional set of pixels and the respective additional destination set of pixels for each of the plurality of rendering intents; and convert the additional source set of pixels to an additional output set of pixels using the selected additional rendering intent.

23. The system as recited in claim 17, wherein the program instructions are executable by the at least one processor to:

applying a global constraint to the output set of pixels to preserve a smoothness characteristic.

24. The system as recited in claim 17, wherein the program instructions are executable by the at least one processor to:

applying a global constraint to the output set of pixels to preserve a texture characteristic.

* * * * *